United States Patent
Médioni et al.

(10) Patent No.: US 10,957,359 B2
(45) Date of Patent: *Mar. 23, 2021

(54) SYSTEMS AND METHODS FOR DETECTING MOMENTS WITHIN VIDEOS

(71) Applicant: GoPro, Inc., San Mateo, CA (US)

(72) Inventors: Tom Médioni, Paris (FR); Vincent Garcia, Issy-les-Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,782

(22) Filed: Feb. 7, 2020

(65) Prior Publication Data
US 2020/0176030 A1    Jun. 4, 2020

Related U.S. Application Data

(63) Continuation of application No. 16/541,461, filed on Aug. 15, 2019, now Pat. No. 10,559,325, which is a continuation of application No. 15/874,407, filed on Jan. 18, 2018, now Pat. No. 10,403,326.

(51) Int. Cl.
  *G11B 27/30*    (2006.01)
  *G11B 27/031*   (2006.01)
  *G11B 27/28*    (2006.01)

(52) U.S. Cl.
  CPC ........ *G11B 27/3027* (2013.01); *G11B 27/031* (2013.01); *G11B 27/3081* (2013.01)

(58) Field of Classification Search
  USPC .................................. 386/239–251, 278–290
  See application file for complete search history.

(56) References Cited

U.S. PATENT DOCUMENTS

| | | | |
|---|---|---|---|
| 8,028,234 B2 | 9/2011 | Li | |
| 8,194,986 B2 | 6/2012 | Conwell | |
| 9,615,087 B2 | 4/2017 | Amon | |
| 2003/0185541 A1* | 10/2003 | Green | H04N 21/44008 386/250 |
| 2011/0103773 A1 | 5/2011 | Johnson | |
| 2016/0065994 A1* | 3/2016 | Kokaska | H04N 21/2365 375/240.26 |
| 2016/0337691 A1* | 11/2016 | Prasad | H04N 21/4394 |
| 2017/0148488 A1 | 5/2017 | Li | |

* cited by examiner

*Primary Examiner* — Hung Q Dang
(74) *Attorney, Agent, or Firm* — Esplin & Associates, PC

(57) ABSTRACT

Video information defining video content may be obtained. The video content may include video frames and may have a progress length. The video frames may be encoded into video packets, with the video packets being of particular sizes. One or more size criteria for detecting a given moment within the video content may be obtained. The sizes of the video packets may be compared with the one or more size criteria. One or more sets of the video packets that satisfy the one or more size criteria may be identified. One or more portions of the video content having video frames defined by the set(s) of video packets that satisfy the one or more size criteria may be identified as the given moment within the video content. Storage of the identification of the given moment within the video content in a storage medium may be effectuated.

20 Claims, 5 Drawing Sheets

SYSTEMS AND METHODS FOR DETECTING MOMENTS WITHIN VIDEOS

FIELD

This disclosure relates to detecting moments within videos using sizes of video packets.

BACKGROUND

A video may include one or more moments that are of interest to users. Analyzing content of a video to detect such moments may be computationally expensive. For example, decoding video frames within a video and analyzing the video frames may be computationally expensive.

SUMMARY

This disclosure relates to detecting moments within videos. Video information defining video content, one or more size criteria for detecting a given moment within the video content, and/or other information may be obtained. Size criteria may include one or more factors by which moment(s) within the video content may be identified/determined based on sizes (e.g., actual size, storage size) of video packets. The video content may include video frames and may have a progress length. The video frames may be encoded into video packets, with the video packets being of particular sizes. The sizes of the video packets may be compared with the one or more size criteria. One or more sets of the video packets that satisfy the one or more size criteria may be identified. One or more portions of the video content having video frames defined by the set(s) of video packets that satisfy the one or more size criteria may be identified as the given moment within the video content. Storage of the identification of the given moment within the video content in a storage medium may be effectuated.

A system for detecting moments within videos may include one or more of electronic storage, processor, and/or other components. The electronic storage may store video information defining video content and/or other information. Video content may refer to media content that may be consumed as one or more videos. Video content may include one or more videos stored in one or more formats/containers, and/or other video content. Video content may include video frames. Video content may have a progress length. The video frames may be encoded into video packets. The video packets may be of particular sizes.

The processor(s) may be configured by machine-readable instructions. Executing the machine-readable instructions may cause the processor(s) to facilitate detecting moments within videos. The machine-readable instructions may include one or more computer program components. The computer program components may include one or more of a video information component, a size criteria component, a comparison component, a video packet component, a video portion component, a storage component, and/or other computer program components.

The video information component may be configured to obtain video information defining one or more video content and/or other information. The video information component may obtain video information from one or more locations. The video information component may be configured to obtain video information defining one or more video content during acquisition of the video content and/or after acquisition of the video content by one or more image sensors.

The size criteria component may be configured to obtain one or more size criteria for detecting a given moment within the video content and/or other information. In some implementations, one or more size criteria may include a given decrease in the sizes of the video packets over a particular duration within the progress length. The given decrease in the size of the video packets may include decrease of an absolute size and/or a relative size.

The comparison component may be configured to compare the sizes of the video packets with the one or more size criteria and/or other information. The comparison component may compare sizes of individual video packets, sizes of multiple video packets defining sequential video frames of the video content, and/or sizes of multiple video packets defining non-sequential video frames of the video content with the one or more size criteria.

The video packet component may be configured to identify one or more sets of the video packets that satisfy the one or more size criteria. The one or more sets of the video packets may include multiple video packets defining sequential video frames of the video content and/or non-sequential video frames of the video content. The comparison of the sizes of the video packets with the one or more size criteria and the identification of the set(s) of the video packets that satisfy the one or more size criteria may provide for analysis of the sizes of the video packets.

The video portion component may be configured to identify one or more portions of the video content having video frames defined by the set(s) of video packets that satisfy the one or more size criteria as the given moment within the video content. The video portion component may use the analysis of the sizes of the video packets to identify the portion(s) of the video content as the given moment (e.g., moment of interest) within the video content. The given moment may be identified without decoding the video frames.

In some implementations, the given moment may include a point or a duration within the progress length during which the video content includes a dark frame. In some implementations, a dark frame may include a black frame. In some implementations, the video content may be captured by an image capture device, and the dark frame may be captured by the image capture device based on covering of an optical element of the image capture device during capture of the video content.

In some implementations, the video portion component may be configured to generate a video summary. The video summary may include a transition at the given moment. In some implementations, the transition may include a change from a first portion of the progress length to a second portion of the progress length. The first portion may not be adjacent to the second portion. In some implementations, the transition may include a change from the video content to another video content.

The storage component may be configured to effectuate storage of the identification of the given moment within the video content and/or other information in one or more storage media. The storage component may effectuate storage of the identification of the given moment within the video content and/or other information in one or more storage locations including the video information and/or other storage locations.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
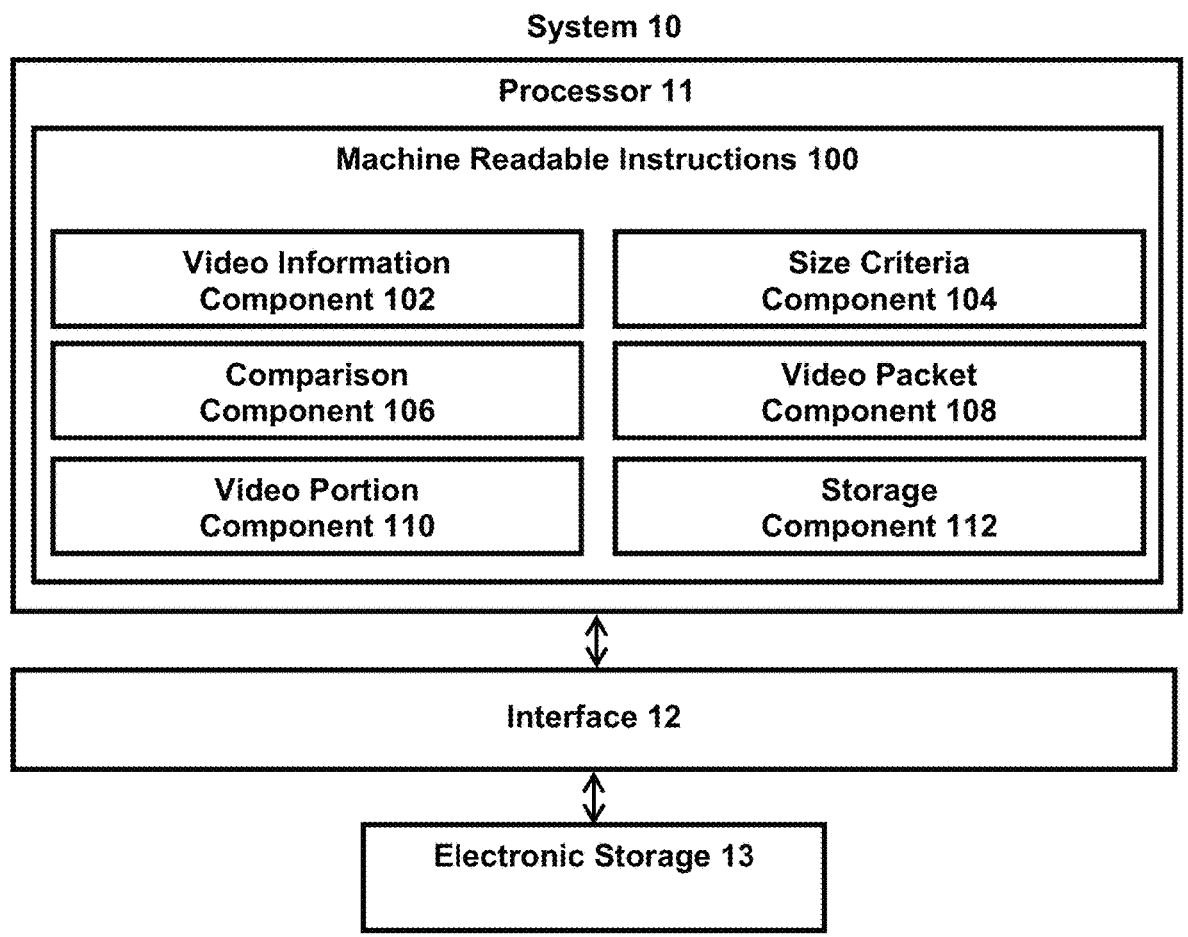
FIG. 1 illustrates a system that detects moments within videos.

FIG. 1 illustrates a system 10 for detecting moments within videos. The system 10 may include one or more of a processor 11, an interface 12 (e.g., bus, wireless interface), an electronic storage 13, and/or other components. Video information defining video content, one or more size criteria for detecting a given moment within the video content, and/or other information may be obtained by the processor 11. Size criteria may include one or more factors by which moment(s) within the video content may be identified/determined based on sizes (e.g., actual size, storage size) of video packets. The video content may include video frames and may have a progress length. The video frames may be encoded into video packets, with the video packets being of particular sizes. The sizes of the video packets may be compared with the one or more size criteria. One or more sets of the video packets that satisfy the one or more size criteria may be identified. One or more portions of the video content having video frames defined by the set(s) of video packets that satisfy the one or more size criteria may be identified as the given moment within the video content. Storage of the identification of the given moment within the video content in a storage medium may be effectuated.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to video information, video content, video packets, sizes of video packets, size criteria, identification of video packets, identification of portions of video content, and/or other information.

For example, the electronic storage 13 may store video information defining one or more video content and/or other information. Video content may refer to media content that may be consumed as one or more videos. Video content may include one or more videos stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). Video content may include a video clip captured by a video capture device, multiple video clips captured by a video capture device, and/or multiple video clips captured by different video capture devices. Video content may include multiple video clips captured at the same time and/or multiple video clips captured at different times. Video content may include a video clip processed by a video application, multiple video clips processed by a video application and/or multiple video clips processed by different video applications.

Video content may include video frames. Visual (viewable) content of the video content may be included within the video frames of the video content. That is, the video frames may define the visual content of the video content. Video content may have a progress length. Video content may define visual content viewable as a function of progress through the progress length of the video content. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

The video frames may be encoded into video packets. The video packets may be of particular sizes. Individual video frames of the video content may be compressed and encoded into video packets of varying sizes. A size of a video packet may refer to a measure of how much data the video packet contains and/or how much storage space the video packet consumes. A size of a video packet may be measured in numbers of bytes and/or by other measurements. A size of a video packet may include the actual size of the video packet and/or the amount of space being taken up by the video packet on a storage medium.

For example, videos frames of the video content may include different types of video frames (e.g., intra-video frames, predictive video frames), and individual video frames may be written separately in a video stream, and encoded into packets of intraframe/interframe. The video frames may be encoded to provide for size reduction and/or formatting. One or more particular video codec (e.g., encoder) may be used to reduce the size taken up by the video frames and/or to modify the video frames into a particular format. To access the visual information (visual content) included within the video frames, the encoded video frames (e.g., video packets) may need to be decoded using one or more particular video codec (e.g. decoder). However, the decoding process may be resource intensive in terms of processor usage, processing time, memory usage, power/battery usage. Having a lengthy video may make it costly to decode the video frames to analyze the visual content for moment detection.

Rather than decoding the video frames to access the visual information included within the video frames, sizes of the individual video packets may be analyzed to identify particular moments (e.g., moments of interest) within the video content. For example, a dark (e.g., black) frame(s) within the video content may result in video packet(s) of small size. Portions of the video content with dark frames may be characterized by small-sized video packets. That is, when a dark/black frame is encountered in video encoding, the compression algorithm for the encoding may show a drop in size of the video packets. Such differences in size of the video packets may be used to identify different moments within the video content.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate detecting moments within videos. The machine readable instructions 100 may include one or more computer program components. The machine readable instructions 100 may include one or more of a video information component 102, a size criteria component 104, a comparison component 106, a video packet component 108, a video portion component 110, a storage component 112, and/or other computer program components.

The video information component 102 may be configured to obtain video information defining one or more video content and/or other information. Obtaining video information may include one or more of accessing, acquiring, analyzing, determining, examining, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining one or more video content during acquisition of the video information and/or after acquisition of the video information by one or more image sensors. For example, the video information component 102 may obtain video information defining a video while the video is being captured by one or more image sensors. The video information component 102 may obtain video information defining a video after the video has been captured and stored in memory (e.g., the electronic storage 13).

The size criteria component 104 may be configured to obtain one or more size criteria for detecting one or more moments (e.g., given moment(s)) within the video content and/or other information. Obtaining size criteria may include one or more of accessing, acquiring, analyzing, determining, examining, loading, locating, opening, receiving, retrieving, reviewing, storing, and/or otherwise obtaining the size criteria. Size criteria may include one or more factors by which moments within the video content may be identified/determined based on sizes of video packets (measures of actual size/space taken up by video packets). Size criteria may be static or dynamic. That is, size criteria may be the same across different users, different video content, different types of activities captured within video content, different codecs, and/or other variables. Size criteria may be different for different users, different video content, different types of activities captured within video content, different codecs, and/or other variables. Size criteria may be programmed into the size criteria component 104, updated by the size criteria component 104, obtained by the size criteria component 104 from the electronic storage 13 and/or other electronic storage, obtained by the size criteria component 104 from one or more remote locations (e.g., a server, a network, etc.), and/or obtained by the size criteria component 104 in other ways. The size criteria component 104 may be configured to select, based on user input, the size criteria to be used. User input may be received through graphical user interface of a video player/editor application and/or through other means.

Size criteria may define particular sizes/change in sizes of the video packets. For example, one or more size criteria may include a given decrease/increase in the sizes of the video packets over a particular duration (e.g., measured in terms of time, numbers of video frames, numbers of video packets) within the progress length. The given decrease/increase in the size of the video packets may include change in the sizes to and/or below/above a particular size (looking for video packets that drop to/below certain sizes, looking for video packets that rise to/above certain sizes). The given decrease/increase in the size of the video packets may include change by a particular size (looking for video packets that drop/increase by certain sizes).

The given decrease/increase in the size of the video packets may include decrease/increase of an absolute size and/or a relative size. For example, one or more size criteria may include a drop/rise to a particular size value and/or a drop/rise by a particular size value regardless of the size of the video packets. Such size criteria may look for the same size values/same changes in size values regardless of whether the video packets being analyzed are of large size or small size. One or more size criteria may include a drop/rise to a particular size value and/or a drop/rise by a particular size value based on the size of the video packets. That is, the size criteria may look for different size values/different changes in size values based on whether the video packets being analyzed are of large size or small size (e.g., looking for larger size changes for larger video packets).

Size criteria may define particular sizes/changes in sizes for individual video packets and/or for multiple video packets. For example, size criteria may look for individual video packets with particular sizes, sizes below a particular size threshold, and/or sizes above a particular size threshold. Such size criteria may enable identification of sequential and/or non-sequential video packets/video frames based on size.

A size criteria may look for multiple video packets defining sequential video frames of the video content with particular sizes, sizes below a particular size threshold, and/or sizes above a particular size threshold. For example, size criteria may look for multiple video packets defining sequential video frames with particular sizes, sizes below a particular size threshold, and/or sizes above a particular size threshold. Size criteria may look for multiple video packets defining sequential video frames of the video content with one or more particular changes in size (e.g., a particular drop in size over the multiple video packets, a particular rise in size over the sequential video packets, a particular pattern of drop(s) and/or rise(s) in size over the sequential video packets, a particular curve of drop(s)/rise(s) rate over the sequential video packets). Such size criteria may enable identification of sequential video packets/video frames based on size.

A size criteria may look for multiple video packets defining non-sequential video frames of the video content with particular sizes, sizes below a particular size threshold, and/or sizes above a particular size threshold. For example, size criteria may look for multiple video packets defining non-sequential video frames with particular sizes, sizes below a particular size threshold, and/or sizes above a particular size threshold. Size criteria may look for multiple video packets defining non-sequential video frames of the video content with one or more particular changes in size (e.g., a particular drop in size over the non-sequential video packets, a particular rise in size over the non-sequential video packets, a particular pattern of drop(s) and/or rise(s) in size over the non-sequential video packets, a particular curve of drop(s)/rise(s) rate over the non-sequential video packets). Such size criteria may enable identification of non-sequential video packets/video frames based on size.

In some implementations, size criteria may be based on previously identified moments of interest within video content. For example, a moment of interest (at a point or duration within the progress length of the video content) may be identified within a given video content, and the size criteria component 104 may analyze the sizes of the video packet(s) corresponding to the moment of interest to identify the size pattern(s) of the video packets. The identified size pattern(s) of the video packets may be used to generate the size criteria by which similar moments within the given video content and/or other video content may be identified. For example, a desired video capture of a particular shot (e.g., setting sun, surfing activity, skateboarding trick) within a video may be associated with particular visual characteristics that result in particular pattern (e.g., particular size values, particular changes in size values, particular curves of changes in size values) of video packet sizes. Capture of similar shots may be characterized by similar video packet size pattern. The size patterns of identified moments of interest may be used to identify similar video packets within the same video and/or other videos.

The comparison component 106 may be configured to compare the sizes of the video packets with one or more size criteria and/or other information. The comparison component 106 may compare sizes of individual video packets, sizes of multiple video packets defining sequential video frames of the video content, and/or sizes of multiple video packets defining non-sequential video frames of the video content with the one or more size criteria. For example, the comparison component 106 may compare the sizes of individual video packets with size criteria to determine whether the individual video packets meet the size criteria, such as to determine whether the individual video packets are of particular size(s), have sizes below a particular size threshold, and/or have sizes above a particular size threshold.

The comparison component 106 may compare the sizes of multiple video packets with size criteria to determine whether the multiple video packets meet the size criteria. For example, the comparison component 106 may compare the sizes of a certain number of sequential video packets/video packets defining sequential video frames with the size criteria to determine whether the sizes of the video packets are characterized by certain changes in size (a particular drop, a particular rise, a particular pattern of drop(s) and/or rise(s), a particular curve of drop(s)/rise(s) rate). For example, the inclusion of a dark/black video frame in the video content may result in a particular drop in sizes of the video packets and/or certain fluctuation in the sizes of the video packets (e.g., noisy signal). The comparison component 106 may compare the sizes of such video packets/video packets defining video frames with criteria for identifying dark/black video frames.

The comparison component 106 may compare the sizes of a certain number of non-sequential video packets/video packets defining non-sequential video frames with the size criteria to determine whether the sizes of the video packets are characterized by certain changes in size (a particular drop, a particular rise, a particular pattern of drop(s) and/or rise(s)), a particular curve of drop(s)/rise(s) rate). For example, capture of a certain scene/activity may result in one or more rises and/or drops in the sizes of the video packets at different points in the progress length of the video content. The comparison component 106 may compare the sizes of such video packets/video packets defining video frames with criteria for identifying the certain scene/activity.

The video packet component 108 may be configured to identify one or more sets of the video packets that satisfy the one or more size criteria. The video packet component 108 may use the comparison of the sizes of the video packets with the one or more size criteria to determine which of the video packets satisfy the one or more size criteria. The set(s) of the video packets may include individual video packets, multiple video packets defining sequential video frames of the video content, and/or multiple video packets defining non-sequential video frames of the video content. The comparison of the sizes of the video packets with the one or more size criteria and the identification of the set(s) of the video packets that satisfy the one or more size criteria may provide for analysis of the sizes of the video packets. The analysis of the sizes of the video packets may be used to identify one or more portions of the video content as including one or more moments of interest. A moment of interest may refer to a moment (point, duration) within the progress length of the video content that a user may be interested in (e.g., for viewing, for editing, for sharing).

Figure 3:
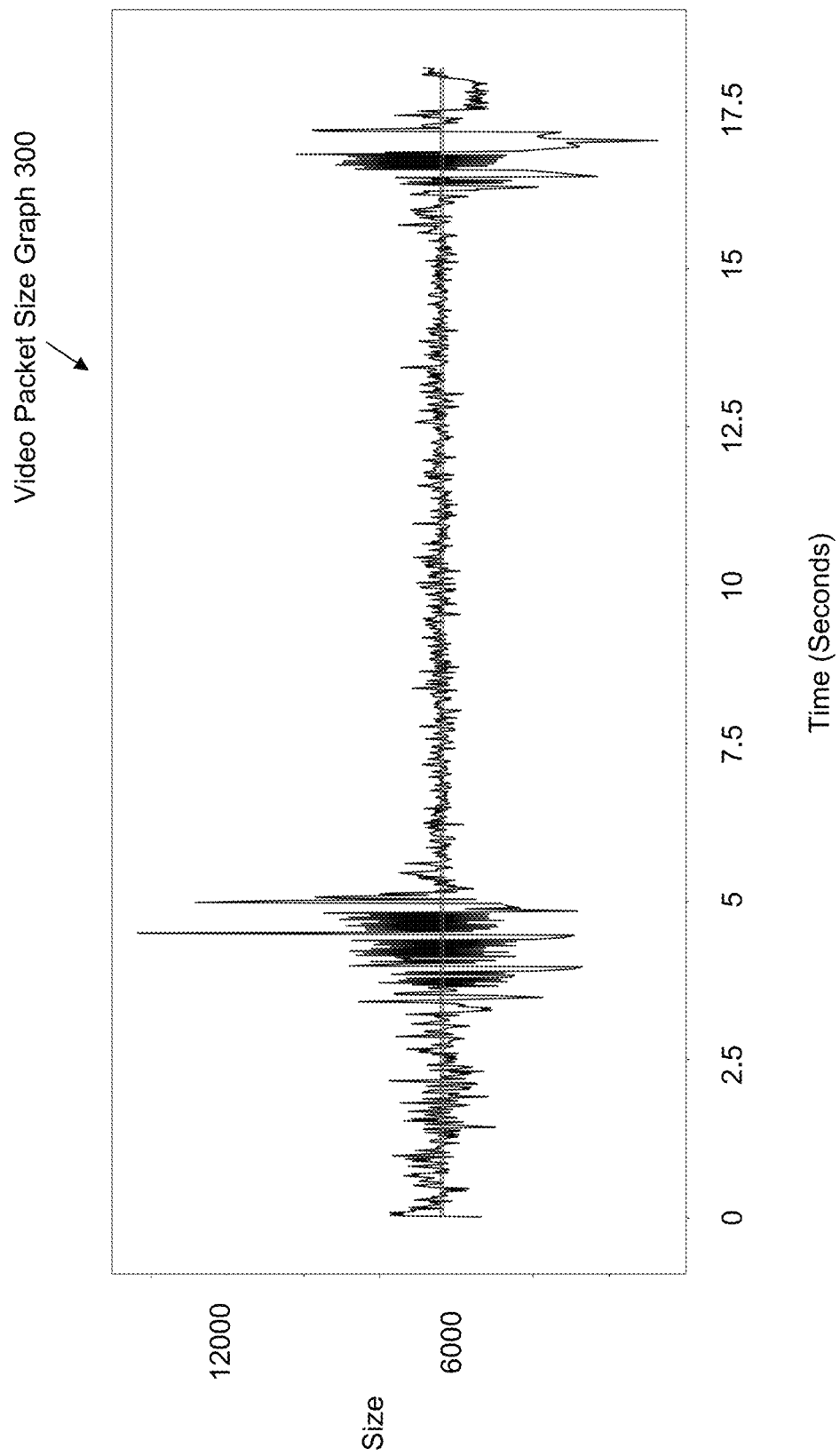
FIG. 3 illustrates an example video packet size graph.

For example, FIG. 3 illustrates an example video packet size graph 300. The video packet size graph 300 may include a plot of video packet sizes as a function of time length of a video. The plot of the video packet sizes in the video packet size graph 300 may include a relatively stable/constant value between 0 second mark and about 3.5 second mark, and between about 5.5 second mark and about 16 second mark. The relative constant weight of the video packet sizes shown in these portions of the video may indicate a stable video capture. Between 3.5 second mark and 5.5 second mark, and around 16 second mark of the video may be characterized by particular fluctuation in video packet sizes, drop in video packet sizes, and/or rise in video packet sizes.

Such changes in video packet sizes may indicate a non-stable video capture, such as changes in the changes in lighting condition for video capture. For instance, the non-stable video capture may be the result of the lighting conditions for the video capture being changed in a short amount of time (e.g., a person's hand covering the camera lens, resulting in a dark/black frame). The video packet component 108 may identify the set(s) of the video packet (e.g., the video packets at/around 4-5 second marks, the video packets at/around 16 second mark) that satisfy the criteria for identifying dark/black video frames. Identification of video packets based on criteria for identifying other types of video capture (e.g., based on camera movement, based on scene/activity being captured) are contemplated.

The video portion component 110 may be configured to identify one or more portions of the video content having video frames defined by the set(s) of video packets that satisfy the one or more size criteria as detected moment(s) (e.g., the given moment(s)) within the video content. The video portion component 110 may identify the frame(s) included in the video packet(s) that satisfy the size criteria as the detected moment(s) within the video content. The video portion component 110 may identify the point(s)/duration(s) in the progress length of the video content that correspond to the video frame(s) included in the video packet(s) that satisfy the size criteria as the detected moment(s) within the video content. The identified portions may be a continuous portion (a single point/duration within the progress length) and/or discontinuous portions (multiple points in the progress length, multiple durations within the progress length, one or more points and one or more durations within the progress length).

Figure 4A:
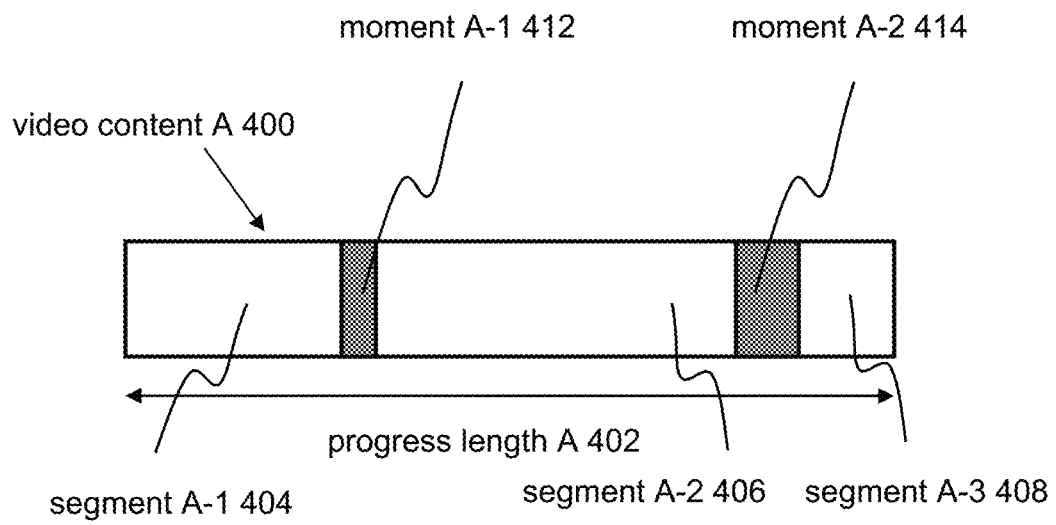
FIGS. 4A-4B illustrate example moment detections within videos.
Figure 4B:
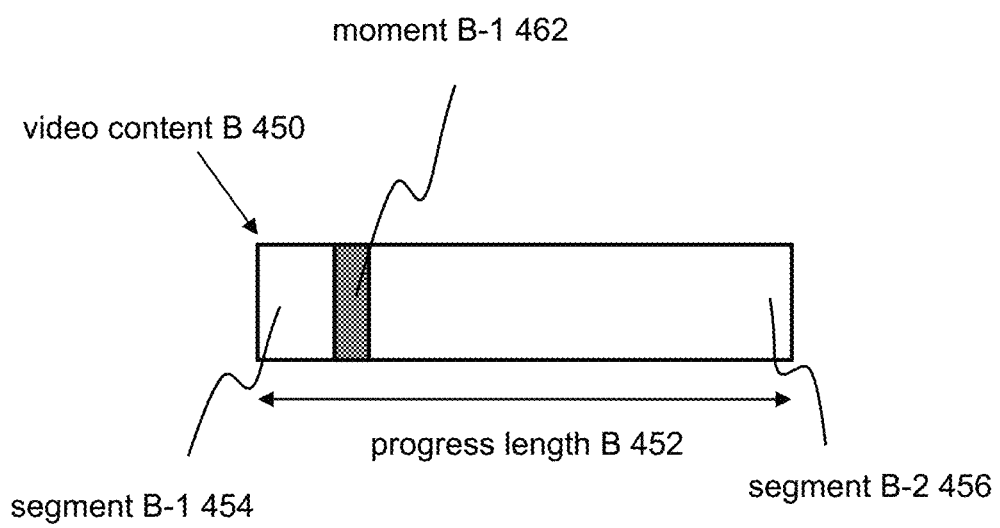

FIGS. 4A-4B illustrate example moment detections within video content A 400 and video content B 450. Referring to FIG. 4A, the video content A 400 may have a progress length A 402. The sizes of video packets of the video content A 400 and one or more size criteria may be used to identify a moment A-1 412 and a moment A-2 414 within the progress length A 402 of the video content A 400. The moment A-2 414 may correspond to a longer portion of the video content A 400 than the moment A-1 412. The moment A-1 412 and the moment A-2 414 may segment the video content A 400 into a segment A-1 404, a segment A-2 406, and a segment A-3 408. Referring to FIG. 4B, the video content B 450 may have a progress length B 452. The sizes of video packets of the video content B 450 and one or more size criteria may be used to identify a moment B-1 462 within the progress length B 452 of the video content B 450. The moment B-1 462 may segment the video content B 450 into a segment B-1 454 and a segment B-2 456.

Thus, the video portion component 110 may use the analysis of the sizes of the video packets to identify the portion(s) of the video content as the detected moment(s) (e.g., given moment(s), moment(s) of interest) within the video content. Such identification of moments within the video content allows the video portion component 110 to identify moments by analyzing the video stream and without decoding the video frames from the video packets. The video portion component 110 does not need to consume resources (e.g., processing, time, memory, power) to decode the encoded video frames in order to identify particular moments within the video content.

For example, the video portion component 110 may identify portion(s) of the video content including dark frames based on the sizes of the video packets. Dark frames may refer to video content captured in low lighting conditions, such as black frames. For example, the video content may have been captured by a particular image capture device, and the dark frame may have been captured by the image capture device based on covering of an optical element (e.g., lens) of the image capture device during capture of the video content. For instance, a person may have grabbed the image capture device during video content capture, and the person's hand may have covered the optical element of the image capture device. The optical element of the image capture device may have been covered by other objects/things. Such portions of the video content may be used as moments during which the video content may be edited. For example, such moments may be used to transition the video content to another video content and/or to transition between different portions of the video content.

In some implementations, the video portion component 110 may be configured to generate a video summary. A video summary of the video content may refer to a video edit that includes one or more portions of the video content. For example, a video summary may include portions of the video content that includes moments of interest. In some implementations, a video summary may be synchronized to one or more soundtracks/songs such that particular moments within the video summary are aligned with particular moments within the soundtracks/songs. A video summary may include a video file with the relevant portions of the video content and/or a file (e.g., director track) that describes how the relevant portions of the video content may be presented during playback. For example, a video summary may include a file including instructions that identify the relevant portions of the video content, the order in which these portions are to be presented, and/or other information regarding presentation of the video content.

In some implementations, the video portion component 110 may generate a video summary such that one or more of the moments of the video content identified based on video packet sizes are included within the video summary. For example, video packet sizes may be used to identify moments that one or more users may find interesting/exciting to watch, and these moments may be included in the video summary.

In some implementations, the video portion component 110 may generate a video summary such that one or more of the moments of the video content identified based on video packet sizes are used to add transitions within the video summary. A transition within the video summary may refer to a video edit at which two non-sequential video portions are joined. For example, a transition may include a change from one portion of the video content to another (non-adjacent) portion of the same video content. A transition may include a change from a portion of one video content to a portion of another video content.

Figure 5A:
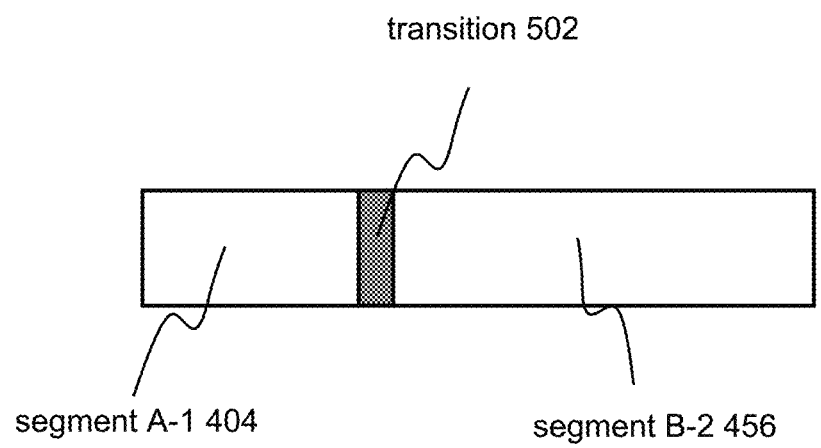
FIGS. 5A-5B illustrate example uses of moment detections within videos.

For example, referring to FIGS. 4A and 4B, the moments 412 414, 462 identified within the progress lengths 402, 452 of the video content 400, 450 may include moments at which the video content 400, 450 include dark/black frames. One or more of the moments 412 414, 462 may be used by the video portion component 110 to insert a transition in the video summary. For example, as shown in FIG. 5A, the video portion component 110 may use the moment A-1 412 and the moment B-1 462 to join together the segment A-1 404 and the segment B-2 456. The segment A-1 404 and the segment B-2 456 may be joined by a transition 502. The transition 502 may include one or more portions of the video frames included in the moment A-1 412 and/or the moment B-1 462. For example, video frames at the start of the moment A-1 412 and the moment B-1 462 may include capture of the lens of a camera being covered and video frames at the end of the moment A-1 412 and the moment B-1 462 may capture of the lens of a camera being uncovered. The transition 502 may switch between the video content A 400 and the video content B 450 such that the transition 502 include the video frames at the start of the moment A-1 412 and the video frames at the end of the moment B-1 454.

Figure 5B:
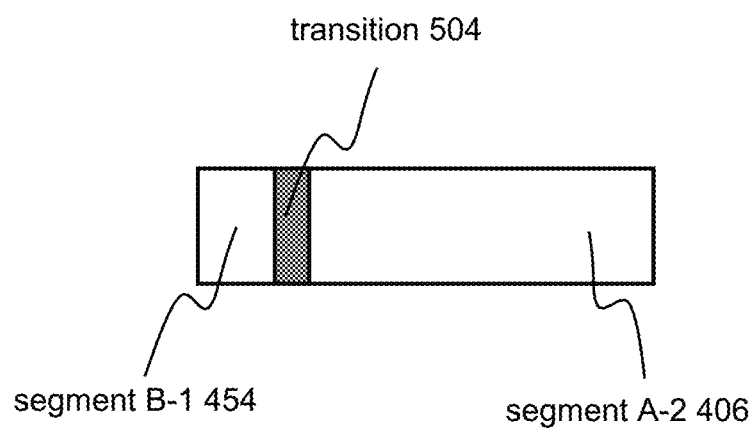

As shown in FIG. 5B, the video portion component 110 may use the moment A-1 412, the moment A-2 414, and the moment B-1 462 to join together the segment A-2 406 and the segment B-1 454. The segment B-1 454 and the segment A-2 406 may be joined by a transition 504. The transition 504 may include one or more portions of the video frames included in the moment B-1 462 and/or the moment A-1 412. In some implementations, the video portion component 110 may include one or more portions of the moment A-2 414 in the video summary shown in FIG. 5B. For example, video frames at the start of the moment A-2 414 may include capture of the lens of a camera being covered, and such video frames may be used to provide an ending to the video summary shown in FIG. 5B.

The storage component 112 may be configured to effectuate storage of the identification of the detected moment(s)

(e.g., given moment(s)) within the video content and/or other information in one or more storage media. The storage component 112 may effectuate storage of the identification of the detected moment(s) within the video content and/or other information in one or more storage locations including the video information and/or other storage locations. In some implementations, the storage component 112 may effectuate storage of video summar(Ies) in one or more storage media.

For example, the video information may have been obtained from the electronic storage 13 and the identification of the detected moment(s) within the video content may be stored in the electronic storage 13. In some implementations, the storage component 112 may effectuate storage of the identification of the detected moment(s) within the video content in one or more remote storage locations (e.g., storage media located at/accessible through a server). In some implementations, the storage component 112 may effectuate storage of the identification of the detected moment(s) within the video content through one or more intermediary devices. Other storage locations for and storage of the identification of the detected moment(s) within the video content are contemplated.

In some implementations, video content may include one or more of spherical video content, virtual reality content, and/or other video content. Spherical video content and/or virtual reality content may define visual content viewable from a point of view as a function of progress through the spherical video/virtual reality content.

Spherical video content may refer to a video capture of multiple views from a location. Spherical video content may include a full spherical video capture (360 degrees of capture, including opposite poles) or a partial spherical video capture (less than 360 degrees of capture). Spherical video content may be captured through the use of one or more cameras/image sensors to capture images/videos from a location. For example, multiple images/videos captured by multiple cameras/image sensors may be stitched together to form the spherical video content. The field of view of cameras/image sensor(s) may be moved/rotated (e.g., via movement/rotation of optical element(s), such as lens, of the image sensor(s)) to capture multiple images/videos from a location, which may be stitched together to form the spherical video content. In some implementations, spherical video content may be stored with a 5.2K resolution. Using a 5.2K spherical video content may enable viewing windows for the spherical video content with resolution close to 1080p. In some implementations, spherical video content may include 12-bit video frames. In some implementations, spherical video content may be consumed as virtual reality content.

Virtual reality content may refer to content (e.g., spherical video content) that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
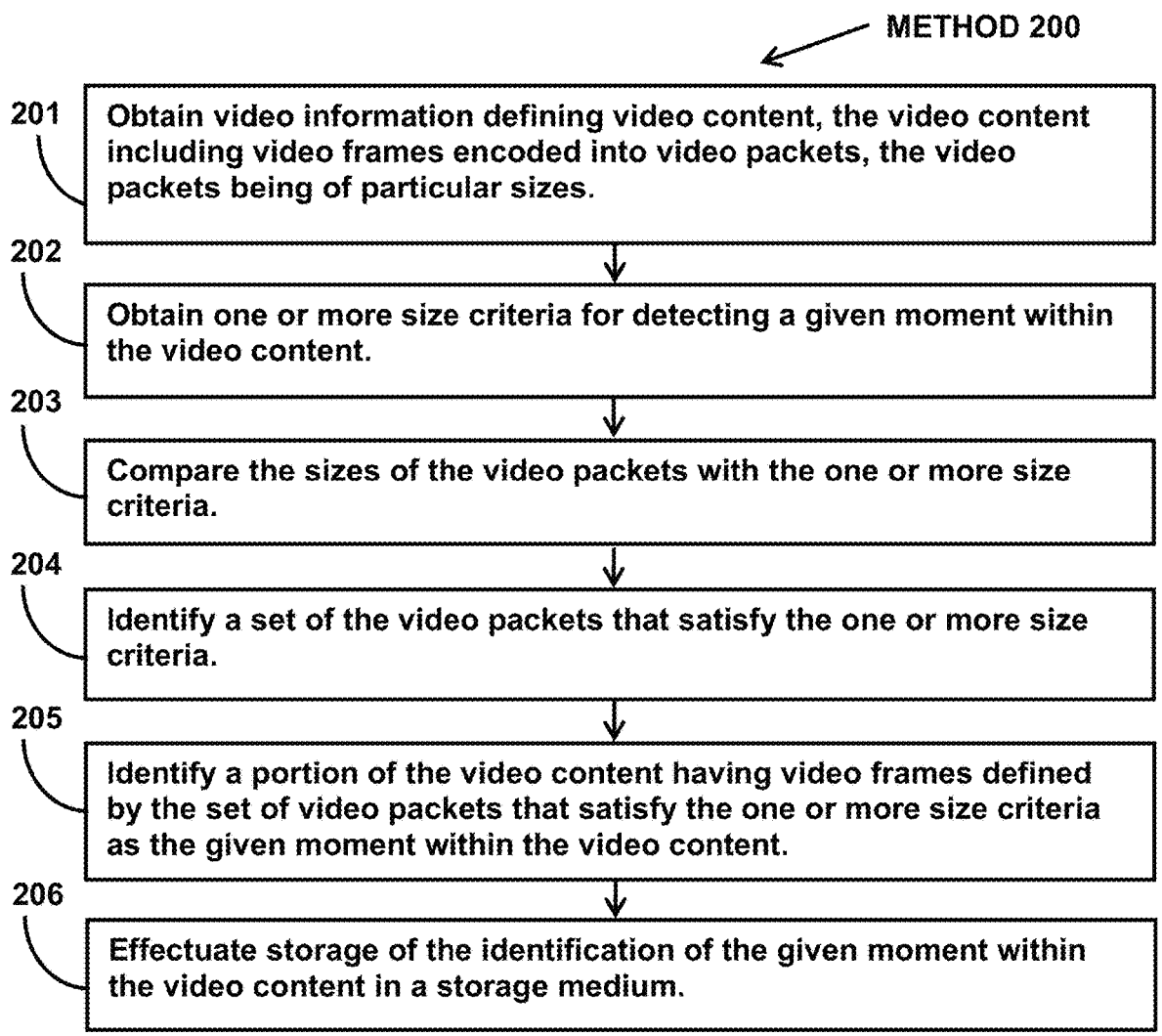
FIG. 2 illustrates a method for detecting moments within videos.

FIG. 2 illustrates method 200 for detecting moments within videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining video content may be obtained. The video content may include video frames and may have a progress length. The video frames may be encoded into video packets. The video packets may be of particular sizes. In some implementation, operation 201 may be performed by a processor component the same as or similar to the video information component 102 (Shown in FIG. 1 and described herein).

At operation 202, one or more size criteria for detecting a given moment within the video content may be obtained. In some implementation, operation 202 may be performed by a processor component the same as or similar to the size criteria component 104 (Shown in FIG. 1 and described herein).

At operation 203, the sizes of the video packets may be compared with the one or more size criteria. In some implementation, operation 203 may be performed by a processor component the same as or similar to the comparison component 106 (Shown in FIG. 1 and described herein).

At operation 204, a set of the video packets that satisfy the one or more size criteria may be identified. In some implementation, operation 204 may be performed by a processor component the same as or similar to the video packet component 108 (Shown in FIG. 1 and described herein).

At operation 205, a portion of the video content having video frames defined by the set of video packets that satisfy the one or more size criteria may be identified as the given moment within the video content. In some implementation, operation 205 may be performed by a processor component the same as or similar to the video portion component 110 (Shown in FIG. 1 and described herein).

At operation 206, storage of the identification of the given moment within the video content in a storage medium may be effectuated. In some implementation, operation 206 may be performed by a processor component the same as or similar to the storage component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for detecting moments within videos, the system comprising:
   one or more physical processors configured by machine-readable instructions to:
   obtain video information, the video information defining video content, the video content including video frames and having a progress length, wherein the video frames are encoded into video packets, the video packets being of particular sizes;
   identify a portion of the video content including video frames with the sizes of the video packets that decrease by a threshold size amount over a duration within the progress length as a transition moment within the video content, the transition moment separating a first video segment of the video content from a second video segment of the video content; and
generate a video summary of the video content, wherein the transition moment is identified to add a transition between two non-sequential video segments in the video summary such that inclusion of the transition in the video summary results in the first video segment not being adjacent to the second video segment in the video summary.

2. The system of claim 1, wherein the transition moment includes a point or a duration within the progress length during which the video content includes a dark frame.

3. The system of claim 2, wherein the dark frame includes a black frame.

4. The system of claim 2, wherein the video content is captured by an image capture device, and the dark frame is captured by the image capture device based on covering of an optical element of the image capture device during capture of the video content.

5. The system of claim 1, wherein the transition moment is identified without decoding the video frames.

6. The system of claim 1, wherein the threshold size amount is an absolute size amount that is independent of the sizes of the video packets.

7. The system of claim 1, wherein the threshold size amount is a relative size amount that is dependent of the sizes of the video packets.

8. The system of claim 1, wherein the two non-sequential video segments in the video summary include the first video segment of the video content and a third video segment of the video content, the first video segment corresponding to a first portion of the progress length and the third video segment corresponding to a second portion of the progress length, the first portion not adjacent to the second portion.

9. The system of claim 8, wherein the first video segment precedes the third video segment in the video summary.

10. The system of claim 8, wherein the third video segment precedes the first video segment in the video summary.

11. The system of claim 1, wherein the two non-sequential video segments in the video summary include the first video segment of the video content and a video segment of another video content.

12. A method for detecting moments within videos, the method performed by a computing system including one or more physical processors, the method comprising:
obtaining, by the computing system, video information, the video information defining video content, the video content including video frames and having a progress length, wherein the video frames are encoded into video packets, the video packets being of particular sizes;
identifying, by the computing system, a portion of the video content including video frames with the sizes of the video packets that decrease by a threshold size amount over a duration within the progress length as a transition moment within the video content, the transition moment separating a first video segment of the video content from a second video segment of the video content; and
generating, by the computing system, a video summary of the video content, wherein the transition moment is identified to add a transition between two non-sequential video segments in the video summary such that inclusion of the transition in the video summary results in the first video segment not being adjacent to the second video segment in the video summary.

13. The method of claim 12, wherein the transition moment includes a point or a duration within the progress length during which the video content includes a dark frame.

14. The method of claim 13, wherein the dark frame includes a black frame.

15. The method of claim 13, wherein the video content is captured by an image capture device, and the dark frame is captured by the image capture device based on covering of an optical element of the image capture device during capture of the video content.

16. The method of claim 12, wherein the transition moment is identified without decoding the video frames.

17. The method of claim 12, wherein the threshold size amount is an absolute size amount that is independent of the sizes of the video packets.

18. The method of claim 12, wherein the threshold size amount is a relative size amount that is dependent of the sizes of the video packets.

19. The method of claim 12, wherein the two non-sequential video segments in the video summary include the first video segment of the video content and a third video segment of the video content, the first video segment corresponding to a first portion of the progress length and the third video segment corresponding to a second portion of the progress length, the first portion not adjacent to the second portion.

20. The method of claim 12, wherein the two non-sequential video in the video summary include the first video segment of the video content and a video segment of another video content.

* * * * *